United States Patent
Lin

(10) Patent No.: US 10,498,620 B2
(45) Date of Patent: Dec. 3, 2019

(54) METHOD AND SYSTEM FOR MONITORING IOT DEVICES

(71) Applicant: Shanghai Kohler Electronics, LTD, Shanghai (CN)

(72) Inventor: Zhansheng Lin, Shanghai (CN)

(73) Assignee: SHANGHAI KOHLER ELECTRONICS, LTD. (CN)

( * ) Notice: Subject to any disclaimer, the term of this patent is extended or adjusted under 35 U.S.C. 154(b) by 208 days.

(21) Appl. No.: 15/856,709

(22) Filed: Dec. 28, 2017

(65) Prior Publication Data

US 2018/0191592 A1 Jul. 5, 2018

(30) Foreign Application Priority Data

Dec. 29, 2016 (CN) .......................... 2016 1 1249884

(51) Int. Cl.
*G06F 15/16* (2006.01)
*H04L 12/26* (2006.01)
*H04W 4/70* (2018.01)
*H04L 29/08* (2006.01)

(52) U.S. Cl.
CPC .......... *H04L 43/0817* (2013.01); *H04L 67/02* (2013.01); *H04W 4/70* (2018.02)

(58) Field of Classification Search
CPC ....... H04L 43/0817; H04L 67/02; H04W 4/70
See application file for complete search history.

(56) References Cited

U.S. PATENT DOCUMENTS

| 7,343,400 B2 * | 3/2008 | Demoto | H04L 12/5692 709/203 |
| 8,520,651 B2 * | 8/2013 | Yamada | H04L 12/2834 370/315 |
| 10,064,231 B2 * | 8/2018 | Ando | H04W 8/005 |
| 2002/0038370 A1 * | 3/2002 | Demoto | H04L 12/5692 709/227 |
| 2017/0086237 A1 * | 3/2017 | Ando | H04W 8/005 |

* cited by examiner

*Primary Examiner* — Moustafa M Meky
(74) *Attorney, Agent, or Firm* — Foley & Lardner LLP

(57) ABSTRACT

A method for monitoring Internet of Things (IoT) devices includes activating a communication connection with a terminal device in response to a monitoring request for the terminal device, conducting communications of monitoring data corresponding to the monitoring request via the communication connection, and controlling a state of the communication connection according to an operating mode of the terminal device.

18 Claims, 3 Drawing Sheets

S101: Activate a communication connection with a terminal device in response to a monitoring request for the terminal device S102: Conduct communications of monitoring data corresponding to the monitoring request via the communication connection, and then control a state of the communication connection according to an operating mode of the terminal device

METHOD AND SYSTEM FOR MONITORING IOT DEVICES

CROSS-REFERENCE TO RELATED PATENT APPLICATION

This application claims the benefit of and priority to Chinese Patent Application No. 201611249884.X filed Dec. 29, 2016, the entire disclosure of which is incorporated by reference herein.

BACKGROUND

The present disclosure relates to the field of Internet of Things (IoT) monitoring technologies, and in particular to a monitoring method, monitoring apparatus and monitoring system for IoT devices.

Some IoT monitoring systems connect various types of terminal devices to a gateway in a wireless connection manner (e.g., Bluetooth) and maintain the connection to implement data communications for the purpose of monitoring the terminal devices. Specifically, when the gateway needs to control a terminal device, it may send a control instruction to the specified terminal device via a wireless network (e.g., Bluetooth) and the terminal device executes a corresponding action upon receiving the control instruction. When the terminal device needs to upload data, it similarly uploads the data to the gateway via the wireless network.

When energy consumption is considered, such a monitoring system is only applicable to terminal devices with low power-saving requirements, which are usually terminal devices having an AC power supply. In the context of smart sanitation and bathroom systems, such devices may include toilets, squat toilets, urinals, faucets, soap dispensers, hand dryers, electronic mirror cabinets, or other devices with an AC power supply. However, terminal devices in an IoT system are not limited to devices with AC power supplies. If the above mode is used to monitor some terminal devices that are powered by storage batteries, the power consumption is very high. The storage batteries need to be frequently charged to meet the power demand required for device monitoring, which can be inconvenient. In addition, there are many different types of terminal devices in an IoT system, and the monitoring methods used in the prior art cannot satisfy diverse monitoring needs for different types of devices.

SUMMARY

The present disclosure provides a monitoring method, monitoring apparatus, and monitoring system for IoT devices, and is intended to overcome the drawbacks of the prior art and solve the power consumption problem of diverse terminal devices in an IoT system.

One implementation of the present disclosure is a method for monitoring IoT devices. The method includes activating a communication connection with a terminal device in response to a monitoring request for the terminal device, conducting communications of monitoring data corresponding to the monitoring request via the communication connection, and controlling a state of the communication connection according to an operating mode of the terminal device.

In some embodiments, the monitoring request for the terminal device includes a control request for requesting control of the terminal device. In some embodiments, conducting communications of the monitoring data corresponding to the monitoring request via the communication connection includes sending a control instruction corresponding to the control request to the terminal device via the communication connection.

In some embodiments, the monitoring request includes a data uploading request for requesting an upload of data. In some embodiments, conducting communications of the monitoring data corresponding to the monitoring request via the communication connection includes receiving data uploaded by the terminal device via the communication connection.

In some embodiments, the monitoring request includes an identifier of the terminal device. The method may further include determining an operating mode of the terminal device according to the identifier.

In some embodiments, controlling the state of the communication connection according to the operating mode of the terminal device includes disconnecting the communication connection if the operating mode is a first mode and maintaining the communication connection if the operating mode is a second mode.

Another implementation of the present disclosure is a monitoring apparatus for IoT devices. The monitoring apparatus includes a connection module configured to activate a communication connection with a terminal device in response to a monitoring request for the terminal device. The monitoring apparatus further includes a state control module configured to conduct communications of monitoring data corresponding to the monitoring request via the communication connection and control a state of the communication connection according to an operating mode of the terminal device.

In some embodiments, the monitoring request for the terminal device includes a control request for requesting control of the terminal device. In some embodiments, conducting communications of the monitoring data corresponding to the monitoring request via the communication connection includes sending a control instruction corresponding to the control request to the terminal device via the communication connection.

In some embodiments, the monitoring request includes a data uploading request for requesting an upload of data. In some embodiments, conducting communications of the monitoring data corresponding to the monitoring request via the communication connection includes receiving data uploaded by the terminal device via the communication connection.

In some embodiments, the monitoring request includes an identifier of the terminal device. In some embodiments, the monitoring apparatus further includes a mode determining module configured to determine an operating mode of the terminal device according to the identifier.

In some embodiments, controlling the state of the communication connection according to the operating mode of the terminal device includes disconnecting the communication connection if the operating mode is a first mode and maintaining the communication connection if the operating mode is a second mode.

Another implementation of the present disclosure is a monitoring system for IoT devices. The monitoring system includes at least one terminal device and a monitoring apparatus. The monitoring apparatus includes a connection module configured to activate a communication connection with the terminal device in response to a monitoring request for the terminal device. The monitoring apparatus further includes a state control module configured to conduct communications of monitoring data corresponding to the monitoring request via the communication connection and control a state of the communication connection according to an operating mode of the terminal device.

In some embodiments, the at least one terminal device includes a first type device configured to rapidly broadcast a first type of data after power-on and wait for a connection response from the monitoring apparatus. In some embodiments, rapidly broadcasting the first type of data includes broadcasting the first type of data at a period of T1, where 0<T1≤100 milliseconds.

In some embodiments, the at least one terminal device includes a second type device configured to slowly broadcast a second type of data after power-on and, when the second type device needs to upload monitoring data, slowly broadcast a third type of data different from the second type of data and wait for a connection response from the monitoring apparatus. In some embodiments, slowly broadcasting the second type of data includes broadcasting the second type of data at a period of T2, where T2>100 milliseconds. In some embodiments, slowly broadcasting the third type of data includes broadcasting the third type of data at a period of T2, where T2>100 milliseconds.

In some embodiments, the at least one terminal device includes a third type device configured to not broadcast data after power-on and, only when monitoring data need to be uploaded, rapidly broadcast a fourth type of data and wait for a connection response from the monitoring apparatus. In some embodiments, rapidly broadcasting the fourth type of data includes broadcasting the fourth type of data at a period of T1, where 0<T1≤100 milliseconds.

By adopting the monitoring method, monitoring apparatus, and monitoring system for IoT devices according to the embodiments described herein, the communication connection is controlled to be maintained or disconnected promptly according to an operating mode of a terminal device after the communication of monitoring data is completed. The present invention can select a communication connection mode suitable for terminal devices according to power supply situations of various terminal devices in an IoT system. This not only ensures communication needs for monitoring data of various terminal devices, but also takes energy consumption requirements of various terminal devices into consideration. The present invention may be compatible to products of different types, may achieve low power consumption, and may also achieve data uploading and control.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Preferred embodiments of the present disclosure will be described in detail below with reference to the accompanying drawings, which will facilitate the understanding of the objects and advantages of the present invention, wherein.

DETAILED DESCRIPTION

The present invention will be described in detail below with reference to the embodiments. A monitoring method, monitoring apparatus and monitoring system for Internet of Things (IoT) devices are provided. The monitoring method includes activating a communication connection with a terminal device in response to a monitoring request for the terminal device, conducting communications of monitoring data corresponding to the monitoring request via the communication connection, and then controlling a state of the communication connection according to an operating mode of the terminal device. The monitoring apparatus includes a connection module and a state control module configured to execute the above steps. The monitoring system includes the above monitoring apparatus and at least one terminal device. The adoption of the monitoring method, monitoring apparatus, and monitoring system for IoT devices not only ensures communication needs for monitoring data of various terminal devices, but also takes energy consumption requirements of various terminal devices into consideration.

In some embodiments, a monitoring method for IoT devices can be used to monitor terminal devices in various IoT systems, including the control of the terminal devices and receiving data uploaded from the terminal devices. For example, the monitoring method can be used in an IoT system formed by various smart sanitation and bathroom devices. The smart sanitation and bathroom devices may include devices with AC power supply (e.g., toilets, squat toilets, urinals, faucets, soap dispensers, hand dryers, electronic mirror cabinets, etc.), devices with power supplied by batteries or storage batteries (e.g., toilets, squat toilets, urinals, faucets, soap dispensers, etc.), and devices with power supplied by small capacity batteries (e.g., leakage alarms, overflow alarms, temperature and humidity collectors, falling alarms for elderly people, etc.), or any combination thereof. The above devices can be connected to a gateway in a wireless connection manner (e.g., Bluetooth, WiFi, etc.) to form an IoT system.

First Embodiment

Figure 1:
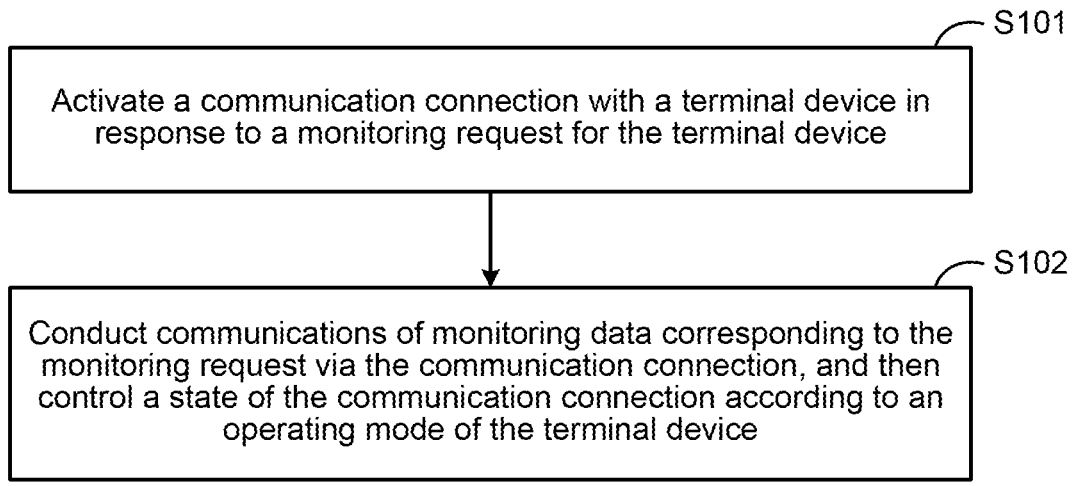
FIG. 1 is a flow chart of a monitoring method for IoT devices, according to an exemplary embodiment.

FIG. 1 is a flow chart of a monitoring method for IoT devices, according to an exemplary embodiment. As shown in FIG. 1, the monitoring method for IoT devices can be executed by a central control device in the same IoT system as the terminal devices, and specifically implemented through the following steps.

At step S101, the central control device activates a communication connection with a terminal device in response to a monitoring request for the terminal device. The monitoring request can be a control request input by a user or a data uploading request issued by the terminal device.

In some embodiments, the terminal device may broadcast data at a certain frequency. When a user inputs a control request for requesting a control of the terminal device, a communication connection (e.g., a Bluetooth connection)

can be established with the terminal device in response to the data broadcast by the terminal device. The central control device can send a control instruction corresponding to the control request to the terminal device via the communication connection (e.g., Bluetooth connection) to realize control of the terminal device.

In some embodiment, the terminal device may broadcast data at a certain frequency. When the terminal device needs to upload data to the central control device, the central control device establishes a communication connection (e.g., a Bluetooth connection) with the terminal device in response to the data broadcast by the terminal device. The terminal device can upload the data to the central control device via the communication connection. In some embodiments, the data broadcast by the terminal device are different when there is data to be uploaded versus when there is no data to be uploaded. Such differences in the data can facilitate identification and determination by the central control device. For example, first broadcasting data can be issued in a normal situation (e.g., when there is data to upload), and second broadcasting data can be issued when there is a need to upload data.

Step S102 includes communicating monitoring data corresponding to the monitoring request via the communication connection, and then controlling a state of the communication connection according to an operating mode of the terminal device. The monitoring data transmitted and communicated in step S102 can have two types: one is control instructions, and the other is uploaded data. Regardless of the type of monitoring data, the central control device can determine, when the communication is completed, an operating mode of a terminal device that completes the communication according to the type of the terminal device. The central control device can also control a state of the previously established communication connection according to the operating mode thereof.

In some embodiments, when the communication of monitoring data is completed, an operating mode of the terminal device is determined according to the type of power supply of the terminal device. For example, if the type of power supply of the terminal device is an AC power supply, then the operating mode is non-energy saving mode. In this case, the impact of power quantity does not need to be considered and the communication connection with the terminal device is maintained, such that monitoring can be performed at any time. However, if the type of power supply of the terminal device is a storage battery, then the operating mode is energy saving mode. In this case, the impact of power quantity needs to be considered and the communication connection with the terminal device is disconnected when the communication of monitoring data is completed to lower the energy consumption.

For a terminal device in the non-energy saving mode, the communication connection is maintained after being established with the central control device for rapid and prompt response. In a smart sanitation and bathroom IoT system, the non-energy saving mode can be used for the control of devices with AC power supply (e.g., toilets, squat toilets, urinals, faucets, soap dispensers, hand dryers, electronic mirror cabinets, etc.).

For a terminal device in the energy saving mode, the communication connection is established only when there is a need for communication of monitoring data, and is promptly disconnected when the communication is completed. In a smart sanitation and bathroom IoT system, the energy saving mode can be used for the control of devices with power supplied by batteries or storage batteries (e.g., toilets, squat toilets, urinals, faucets, soap dispensers, etc.) and devices with power supplied by small capacity batteries (e.g., leakage alarms, overflow alarms, temperature and humidity collectors, falling alarms for elderly people, etc.). The above devices can be connected to a gateway in a wireless connection manner (e.g., Bluetooth, WiFi, etc.) to form a corresponding IoT system.

By adopting the monitoring method for IoT devices according to the embodiment of the present disclosure, the communication connection is controlled to be maintained or disconnected promptly according to an operating mode of a terminal device after the communication of monitoring data is completed. The monitoring method can select a communication connection mode suitable for terminal devices according to power supply situations of various terminal devices in an IoT system. This not only ensures communication needs for monitoring data of various terminal devices, but also takes energy consumption requirements of various terminal devices into consideration. The monitoring method can be used with products of different types, can achieve low power consumption, and can also achieve data uploading and control.

Second Embodiment

Figure 2:
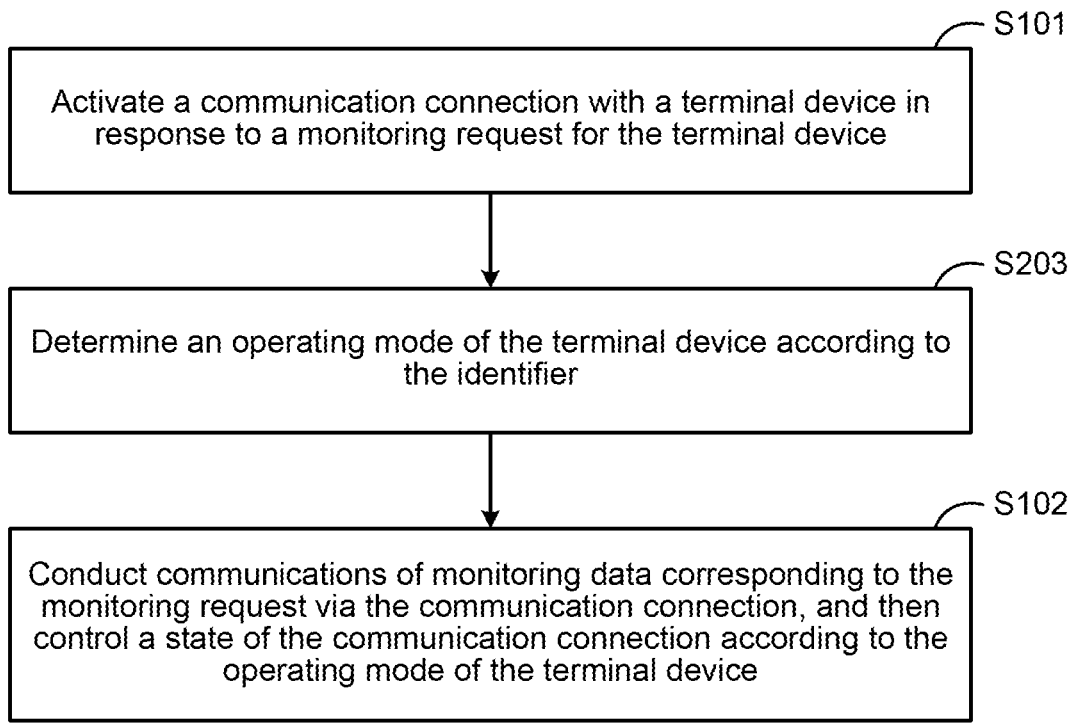
FIG. 2 is a flow chart of another monitoring method for IoT devices, according to an exemplary embodiment.
Figure 3:
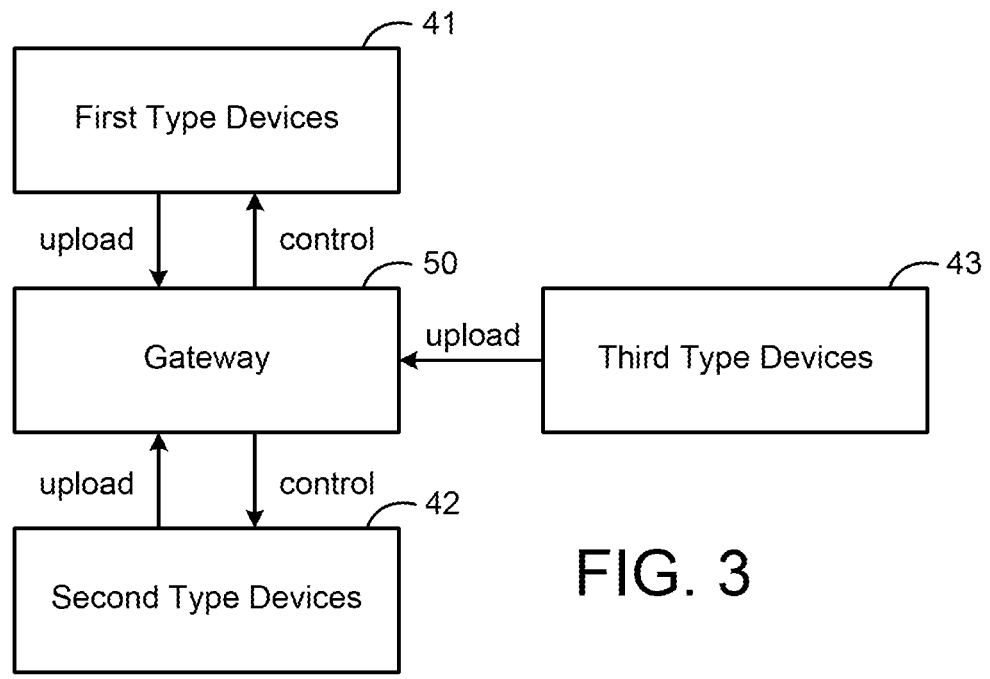
FIG. 3 is a block diagram of a monitoring system for IoT devices configured to perform the monitoring methods of FIGS. 1-2, according to an exemplary embodiment.

FIG. 2 is a flow chart of another monitoring method for IoT devices, according to an exemplary embodiment. FIG. 3 is a block diagram of a monitoring system configured to perform the monitoring method according an exemplary embodiment. The monitoring method for IoT devices will be described in detail below with the monitoring system shown in FIG. 3 as an example. With reference to FIG. 2 and FIG. 3, the monitoring method may be implemented through the following steps.

At step S101, the central control device activates a communication connection with the terminal device in response to a monitoring request for the terminal device. The monitoring request can be a control request input by a user or a data uploading request issued by the terminal device. In some embodiments, the monitoring request for the terminal device may include a control request for requesting control of the terminal device. In this case, the communication of monitoring data may include sending a control instruction corresponding to the control request to the terminal device via the communication connection. In another embodiment, the monitoring communications of monitoring data may include receiving data uploaded by the terminal device via the communication connection. These two cases have been described in the preceding embodiment and will not be repeated herein.

Step S203 includes determining an operating mode of the terminal device according to an identifier. Here, the monitoring request may include an identifier of the terminal device. The identifier may be a name, number, MAC address, etc. of a terminal device. The operating mode determination may be performed according to a list of relations between identifiers and operating modes pre-stored in a gateway 50. For example, when responding to a monitoring request, step S203 may include searching the pre-stored list for an identifier included in the monitoring request and determining an operating mode corresponding to the identifier according to the pre-stored list.

Step S102 includes communicating monitoring data corresponding to the monitoring request via the communication connection, and then controlling a state of the communication connection according to an operating mode of the terminal device. The monitoring data communicated in step S102 may include two types: one is control instructions, and the other is uploaded data. Regardless of the type of monitoring data, the central control device will determine, when the communication is completed, an operating mode of a terminal device that completes the communication according to the type of the terminal device. The central control device can also control a state of the previously established communication connection according to the operating mode thereof. Controlling the state of the communication connection according to an operating mode of the terminal device may include disconnecting the communication connection if the operating mode is a first mode, or maintaining the communication connection if the operating mode is a second mode. Specific examples will be described below.

In FIG. 3, a gateway 50, one or more first type devices 41, one or more second type devices 42, and one or more third type devices 43 form an IoT system. The monitoring method can be executed through the gateway 50.

The first type devices 41 are products that do not have a high demand for electricity saving, but need frequent interactive, real-time control. For example, the first type devices 41 may include devices with an AC power supply (e.g., toilets, squat toilets, urinals, faucets, soap dispensers, hand dryers, electronic mirror cabinets, etc.). After the first type devices 41 are registered to a system, the operating mode of the first type devices 41 (i.e., the non-energy saving operating mode) allows the first type devices 41 to maintain connection with the system. Accordingly, the first type devices 41 are capable of real time communications.

In some embodiments, when the first type device 41 is powered on, it consistently and rapidly broadcasts "data A," and optionally performs rapid broadcasting at a period of several milliseconds to wait for a connection response from the gateway 50. When a user sends a control request via the gateway 50, the control request includes an identifier (e.g., MAC address) of the first type device 41. First, a device list pre-stored in the gateway 50 is searched for a device corresponding to the identifier, and a search result is obtained. If the device exists in the pre-stored device list, then a communication connection (e.g., a Bluetooth connection) is established between the gateway 50 and the first type device 41 in response to the "data A" broadcast by the service. When the connection is successfully established, the operating mode of the first type device 41 is determined through a correspondence between devices and operating modes pre-stored in the gateway 50. For the first type devices 41, their operating mode is a non-energy saving mode. After the communication of monitoring data is completed, the communication connection is always maintained to respond, in real time, to subsequent requests for communications of monitoring data (e.g., requests for sending control instructions and requests for uploading state data).

The second type devices 42 are products that have relatively high requirements for energy saving, but do not need real-time interaction or control, and only need interaction and control under particular conditions. For example, the second type devices 42 may include devices with power supplied by batteries or storage batteries (e.g., toilets, squat toilets, urinals, faucets, soap dispensers, etc.). The operating mode of the second type devices 42 is an energy saving mode. Specifically, after registered to a system, the second type devices 42 establish a communication connection only when there is a request for transmission of monitoring data. However, the communication connection is promptly disconnected when the transmission is completed.

Specifically, the second type devices 42 can always stay in a slow broadcasting state in which the period between data broadcasts is relatively long (e.g., a period of at least several hundred milliseconds). The second type devices 42 can slowly broadcast "data B" when there is no data to be uploaded and can slowly broadcast "data C" when there is data to be uploaded. When the system needs to control a product, a communication connection is directly conducted in response to the "data B" broadcast and the connection is disconnected when the communication is completed. When the device needs to upload state data, the broadcasting data is changed to "data C." When detecting that the product is broadcasting the "data C," the gateway 50 is connected with the product for communication, and the connection is disconnected when the communication is completed.

The third type devices 43 have very high requirements for energy saving, but do not need control. For example, the third type devices 42 may include devices with power supplied by small capacity batteries (e.g., leakage alarms, overflow alarms, temperature and humidity collectors, falling alarms for elderly people, etc.). After the third type devices 43 are registered to a system, the operating mode of the third type devices 43 may not require the third type devices 43 to broadcast any data. The third type devices 43 may be maintained in a disconnected state with the gateway 50, and there is no need to control such devices in real time. When a third type device 43 needs to upload state data, it rapidly broadcasts "data D." When detecting that the third type device 43 is broadcasting the "data D," the gateway 50 is connected with the third type device 43 for communication, and the connection is disconnected when the communication is completed.

By adopting the monitoring method for IoT devices according to the second embodiment of the present disclosure, various terminal devices of different operating modes can be connected into the IoT system. For any device, monitoring can be achieved according to the operating mode required thereby. The monitoring method considers both normal use and energy consumption requirements of the device, is compatible to products of different types, and achieves low power consumption.

Third Embodiment

Figure 4:
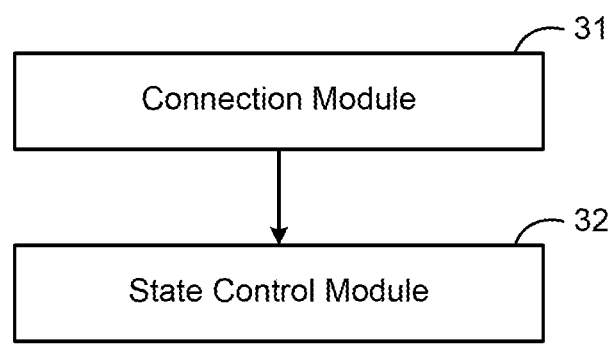
FIG. 4 is a schematic diagram of a monitoring apparatus for IoT devices, according to an exemplary embodiment.

FIG. 4 is a schematic diagram of a monitoring apparatus for IoT devices, according to an exemplary embodiment. As shown in FIG. 4, the monitoring apparatus is configured to execute the monitoring method in the above method embodiments. The monitoring apparatus is shown to include a connection module 31 and a state control module 32. The connection module 31 can be configured to activate a communication connection with a terminal device in response to a monitoring request for the terminal device. The state control module 32 can be configured to conduct communications of monitoring data corresponding to the monitoring request via the communication connection. The state control module 32 can then control a state of the communication connection according to an operating mode of the terminal device. Controlling the state of the communication connection according to the operating mode of the terminal device may include disconnecting the communication connection if the operating mode is a first mode, or maintaining the communication connection if the operating mode is a second mode.

In the case where a terminal device needs to be controlled, the monitoring request for the terminal device may include a control request for requesting control of the terminal device. In some embodiments, communicating monitoring data corresponding to the monitoring request via the communication connection includes sending a control instruction corresponding to the control request to the terminal device via the communication connection. In the case where a terminal device has data to be uploaded, the monitoring request may include a data uploading request for requesting an upload of data. In some embodiments, communicating monitoring data corresponding to the monitoring request via the communication connection includes receiving data uploaded by the terminal device via the communication connection.

In some embodiments, the monitoring request further includes an identifier of the terminal device. The monitoring apparatus may include a mode determining module configured to determine an operating mode of the terminal device according to the identifier.

The connection module 32 and the state control module 32 can be configured to execute one or more of the steps in the above method embodiments (i.e., the first embodiment and the second embodiment). Reference may be made to the description in the above method embodiments for a detailed process, which will not be repeated here.

By adopting the monitoring apparatus for IoT devices as described herein, the communication connection is controlled to be maintained or disconnected promptly according to an operating mode of a terminal device after the communication of monitoring data is completed. The present invention can select a communication connection mode suitable for terminal devices according to power supply situations of various terminal devices in an IoT system. This not only ensures communication needs for monitoring data of various terminal devices, but also takes energy consumption requirements of various terminal devices into consideration. The present invention may be compatible with products of different types, may achieve low power consumption, and also may achieve data uploading and control.

Fourth Embodiment

Figure 5:
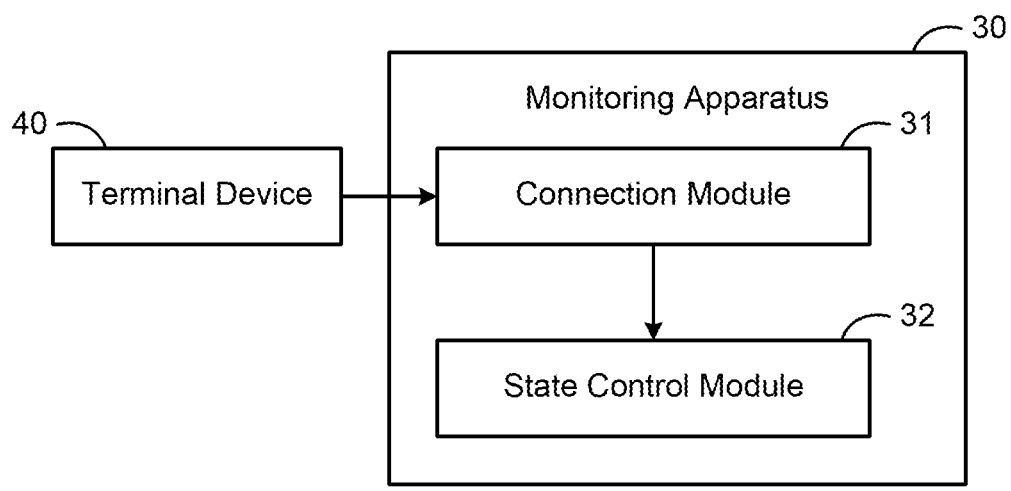
FIG. 5 is a schematic diagram of another monitoring system for IoT devices, according to an exemplary embodiment.

FIG. 5 is a schematic diagram of the monitoring system for IoT devices, according to an exemplary embodiment. As shown in FIG. 5, the monitoring system for IoT devices includes the monitoring apparatus 30 set forth in the above embodiment and at least one terminal device 40. The terminal device 40 may be the first type device 41, the second type device 42, and/or the third type device 43 set forth in the second embodiment. See the description in the second embodiment for details.

The first type device 41 rapidly broadcasts a first type of data (e.g., "data A" above) after power-on to wait for a connection response from the monitoring apparatus. The second type device 42 slowly broadcasts a second type of data (e.g., "data B" above) after power-on. When the second type device 42 needs to upload monitoring data, the second type device 43 slowly broadcasts a third type of data (e.g., "data C" above) that is different from the second type of data to wait for a connection response from the monitoring apparatus. The third type device 43 does not broadcast data after power-on. However, only when monitoring data needs to be uploaded, the third type device 43 rapidly broadcasts a fourth type of data (e.g., "data D" above) to wait for a connection response from the monitoring apparatus. In some embodiments, the period of the rapid broadcasting is T1 (e.g., 0<T1≤100 milliseconds), whereas the period of the slow broadcasting is T2 (e.g., T2>100 milliseconds).

The monitoring apparatus may include the connection module 31 and the state module 32. The connection module 31 may be configured to activate a communication connection with a terminal device in response to a monitoring request for the terminal device. The state control module 32 may be configured to conduct communications of monitoring data corresponding to the monitoring request via the communication connection, and then control a state of the communication connection according to an operating mode of the terminal device.

By adopting the monitoring system for IoT devices according to the embodiment of the present invention, the communication connection is controlled to be maintained or disconnected promptly according to an operating mode of a terminal device after the communication of monitoring data is completed. The present invention can select a communication connection mode suitable for terminal devices according to power supply situations of various terminal devices in an IoT system. This not only ensures communication needs for monitoring data of various terminal devices, but also takes energy consumption requirements of various terminal devices into consideration. The present invention may be be compatible with products of different types, may achieve low power consumption, and also may achieve data uploading and control.

Fifth Embodiment

The fifth embodiment provides a non-transitory computer readable storage medium. The non-transitory computer readable storage medium stores computer instructions that cause the computer to execute the methods according to the above method embodiments (i.e., the first and second embodiments). Such methods may include activating a communication connection with a terminal device in response to a monitoring request for the terminal device, conducting communications of monitoring data corresponding to the monitoring request via the communication connection, and then controlling a state of the communication connection according to an operating mode of the terminal device.

Sixth Embodiment

The sixth embodiment provides a computer program product. The computer program product includes a computer program stored on a non-transitory computer readable storage medium. The computer program includes program instructions. When the program instructions are executed by a computer, the computer can execute the methods according to the above method embodiments (i.e., the first and second embodiments). Such methods may include activating a communication connection with a terminal device in response to a monitoring request for the terminal device, conducting communications of monitoring data corresponding to the monitoring request via the communication connection, and then controlling a state of the communication connection according to an operating mode of the terminal device.

Seventh Embodiment

Figure 6:
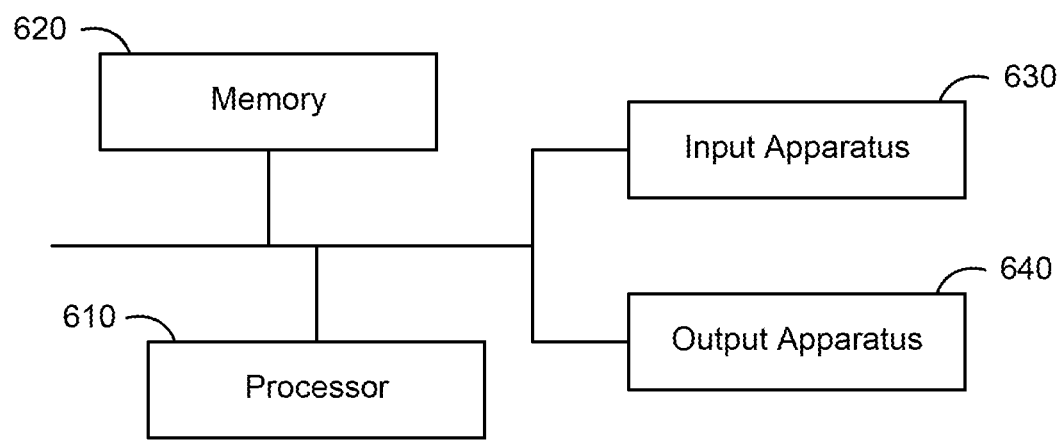
FIG. 6 is a structural schematic diagram of the hardware of an electronic device configured to perform the monitoring methods of FIGS. 1-2, according to an exemplary embodiment.

FIG. 6 is a structural schematic diagram of the hardware of an electronic device for implementing the monitoring method for IoT devices, according to an exemplary embodiment. As shown in FIG. 6, the device includes one or more processors 610 and a memory 620. In FIG. 6, one processor 610 is used as an example. The device may further include an input apparatus 630 and an output apparatus 640. The processor 610, the memory 620, the input apparatus 630, and the output apparatus 640 may be connected via a bus or in other manners. In FIG. 6, connection via a bus is used as an example.

As a non-transitory computer, the memory 620 may be used to store non-transitory software programs and non-transitory computer executable programs and modules. Such programs and modules may include program instructions/modules (e.g. the connection module 31 and the state control module 32 shown in FIG. 4) corresponding to the monitoring method for IoT devices as previously described. By running the non-transitory software programs, instructions and modules stored in the memory 620, the processor 610 executes various functional applications and data processing of a server, namely implementing the monitoring method for IoT devices according to the above method embodiments.

The memory 620 may include a program memory zone and a data memory zone. The program memory zone may store an operating system and an application program required by at least one function. The data memory zone may store data created according to the use of the monitoring apparatus for IoT devices. In addition, the memory 620 may include high-speed Random Access Memory (RAM) and/or non-transitory memory (e.g., at least one magnetic disk storage device, a flash memory device, or other non-transitory solid storage devices). In some embodiments, the memory 620 includes memory arranged remotely relative to the processor 610. The remote memory may be connected to the monitoring apparatus for IoT devices via a network. Examples of the above network include, but are not limited to, the Internet, a business intranet, a local area network, a mobile communication network, and combinations thereof.

The input apparatus 630 may receive input number or character information, and generate key signal inputs related to user settings and function controls of the monitoring apparatus for IoT devices. The output apparatus 640 may include display devices such as a display screen.

The one or more modules are stored in the memory 620, and when executed by the one or more processors 610, execute the monitoring method for IoT devices in any one of the above method embodiments.

The above products may execute the method according to the embodiments of the present application, may possess functional modules corresponding to the method execution, and may have the advantageous effects. Reference is made to the methods described in the first embodiment and the second embodiment above for technical details that are not described in detail here.

The electronic device may exist in a variety of forms, including, but not limited to mobile communication devices, ultra mobile personal computer devices, portable entertainment devices, servers, and other electronic devices having data interactive functions.

Mobile communication devices are characterized by having mobile communication functions, and have can be configured to provide voice and data communications. This type of device includes smart phones (e.g., iPhone), multimedia cell phones, functional cell phones, and low-end cell phones.

Ultra mobile personal computer devices belong to the category of personal computers. This type of devices has computation and processing functions, and typically has features of mobile Internet access. This type of device includes PDA, MID and UMPC devices, such as iPad.

Portable entertainment devices can display and play multimedia contents. This type of device includes audio and video players (such as iPod), handheld game consoles, e-books, smart toys, and portable vehicle mounted navigation devices.

Servers include devices that provide computation services. A server may include a processor, a hard disk, a memory, a system bus, etc. The server is similar to a general computer architecture. Due to the need to provide highly reliable services, however, a server has relatively high requirements in processing capability, stability, reliability, security, expandability, manageability and the like.

Configuration of Exemplary Embodiments

It should be noted that the systems and methods described herein are merely illustrative. Devices or components described as separate parts may or may not be physically separated, and the parts displayed as units may or may not be physical units. For example, they may be disposed at one location or may be distributed to multiple network units. Some or all of the modules may be selected according to actual needs to achieve the goals of the solutions of the embodiments. Those skilled in the art can understand and implement them without innovative effort.

Through the description of the above implementation manners, those skilled in the art can clearly understand that the implementation manners may be achieved by means of software plus necessary general hardware platforms, and certainly may also be achieved by means of hardware. On the basis of such an understanding, the part of the above technical solution that is essential or contributes to the prior art may be implemented in a form of a software product. The computer software product may be stored in a computer readable storage medium, such as ROM/RAM, magnetic disks, optical disks, etc., which includes several instructions to enable a computer apparatus (which may be a personal computer, a server, or a network device) to execute the methods set forth in the embodiments or in some parts of the embodiments.

Finally, it should be noted that the above embodiments are only used to describe, rather than limit, the technical solutions of the present invention. Although the present invention has been described in detail with reference to the above embodiments, those skilled in the art should understand that they can still modify the technical solutions recorded in the above embodiments, or conduct equivalent substitutions for some technical features thereof. These modifications and substitutions do not make the essence of corresponding technical solutions to depart from the scope of the technical solutions in the embodiments of the present invention

What is claimed is:

1. A method for monitoring Internet of Things (IoT) devices, the method comprising:
   activating a communication connection with a terminal device in response to a monitoring request for the terminal device;
   conducting communications of monitoring data corresponding to the monitoring request via the communication connection; and
   controlling a state of the communication connection according to an operating mode of the terminal device.

2. The method of claim 1, wherein:
   the monitoring request for the terminal device comprises a control request for requesting control of the terminal device; and
   conducting communications of the monitoring data corresponding to the monitoring request via the communication connection comprises sending a control instruction corresponding to the control request to the terminal device via the communication connection.

3. The method of claim 1, wherein:
the monitoring request comprises a data uploading request for requesting an upload of data; and
conducting communications of the monitoring data corresponding to the monitoring request via the communication connection comprises receiving data uploaded by the terminal device via the communication connection.

4. The method of claim 1, wherein the monitoring request further comprises an identifier of the terminal device;
the method further comprising determining an operating mode of the terminal device according to the identifier.

5. The method of claim 4, wherein controlling the state of the communication connection according to the operating mode of the terminal device comprises:
disconnecting the communication connection if the operating mode is a first mode; and
maintaining the communication connection if the operating mode is a second mode.

6. A monitoring apparatus for Internet of Things (IoT) devices, the monitoring apparatus comprising:
a connection module configured to activate a communication connection with a terminal device in response to a monitoring request for the terminal device; and
a state control module configured to:
conduct communications of monitoring data corresponding to the monitoring request via the communication connection; and
control a state of the communication connection according to an operating mode of the terminal device.

7. A monitoring apparatus of claim 6, wherein:
the monitoring request for the terminal device comprises a control request for requesting control of the terminal device; and
conducting communications of the monitoring data corresponding to the monitoring request via the communication connection comprises sending a control instruction corresponding to the control request to the terminal device via the communication connection.

8. The monitoring apparatus of claim 6, wherein:
the monitoring request comprises a data uploading request for requesting an upload of data; and
conducting communications of the monitoring data corresponding to the monitoring request via the communication connection comprises receiving data uploaded by the terminal device via the communication connection.

9. The monitoring apparatus of claim 6, wherein the monitoring request further comprises an identifier of the terminal device;
the monitoring apparatus further comprising a mode determining module configured to determine an operating mode of the terminal device according to the identifier.

10. The monitoring apparatus of claim 9, wherein controlling the state of the communication connection according to the operating mode of the terminal device comprises:
disconnecting the communication connection if the operating mode is a first mode; and
maintaining the communication connection if the operating mode is a second mode.

11. A monitoring system for Internet of Things (IoT) devices, the monitoring system comprising:
at least one terminal device; and
a monitoring apparatus comprising:
a connection module configured to activate a communication connection with the terminal device in response to a monitoring request for the terminal device;
a state control module configured to conduct communications of monitoring data corresponding to the monitoring request via the communication connection, and control a state of the communication connection according to an operating mode of the terminal device.

12. The monitoring system of claim 11, wherein the at least one terminal device comprises a first type device configured to rapidly broadcast a first type of data after power-on and wait for a connection response from the monitoring apparatus.

13. The monitoring system of claim 12, wherein rapidly broadcasting the first type of data comprises broadcasting the first type of data at a period of T1, wherein $0<T1\leq100$ milliseconds.

14. The monitoring system of claim 11, wherein the at least one terminal device comprises a second type device configured to:
slowly broadcast a second type of data after power-on; and
when the second type device needs to upload monitoring data, slowly broadcast a third type of data different from the second type of data and wait for a connection response from the monitoring apparatus.

15. The monitoring system of claim 14, wherein slowly broadcasting the second type of data comprises broadcasting the second type of data at a period of T2, wherein $T2>100$ milliseconds.

16. The monitoring system of claim 14, wherein slowly broadcasting the third type of data comprises broadcasting the third type of data at a period of T2, wherein $T2>100$ milliseconds.

17. The monitoring system of claim 11, wherein the at least one terminal device comprises a third type device configured to:
not broadcast data after power-on; and
only when monitoring data need to be uploaded, rapidly broadcast a fourth type of data and wait for a connection response from the monitoring apparatus.

18. The monitoring system of claim 17, wherein rapidly broadcasting the fourth type of data comprises broadcasting the fourth type of data at a period of T1, wherein $0<T1\leq100$ milliseconds.

* * * * *